United States Patent

[11] 3,607,829

| [72] | Inventor | Alexander T. Harris |
| | | Wilmington, Del. |
| [21] | Appl. No. | 748,951 |
| [22] | Filed | July 31, 1968 |
| [45] | Patented | Sept. 21, 1971 |
| [73] | Assignee | E. I. du Pont de Nemours and Company |
| | | Wilmington, Del. |

[54] SULFUR-CURABLE ELASTOMER HAVING IMPROVED BUILDING TACK
14 Claims, No Drawings

[52] U.S. Cl. ................................................ 260/41.5 R,
156/128, 161/231, 260/5, 260/23.7 M, 260/29.3,
260/29.6 XA, 260/33.6 AQ, 260/80.7, 260/82,
260/888, 260/889, 260/894
[51] Int. Cl. ................................................ C08d 9/08,
C08d 9/16
[50] Field of Search ........................................... 260/889,
82, 80.7, 894, 41.5 R

[56] References Cited
UNITED STATES PATENTS

| 2,497,458 | 2/1950 | Kurty | 260/888 |
| 2,698,841 | 1/1955 | McKay | 260/879 |
| 3,290,275 | 12/1966 | Brandt | 260/82 |
| 3,478,005 | 11/1969 | Wheeler | 260/80.7 |
| 3,491,167 | 1/1970 | Soldatos | 260/80.7 |

FOREIGN PATENTS

| 1,062,266 | 3/1967 | Great Britain | 260/80.7 |

*Primary Examiner*—Samuel H. Blech
*Attorney*—Raymond E. Blomstedt

ABSTRACT: A sulfur-curable synthetic elastomer is tackified by mixing with an isoprenoidal resin characterized by a polymer of an isoprene/piperylene co-dimer and an allylically terminated cyclo compound, such as dicyclopentadiene.

3,607,829

SULFUR-CURABLE ELASTOMER HAVING IMPROVED BUILDING TACK

BACKGROUND OF THE INVENTION

Synthetic rubberlike polymers are notably deficient in building tack, which is the surface property of natural rubber which enables two pieces of unvulcanized stock to adhere when brought into contact under moderate pressure. Surprisingly enough this characteristic is peculiar to two pieces of natural rubber and neither will adhere to other substances in a like manner; for example, such adhesion does not exist between natural rubber and metal, glass or wood. Unfortunately synthetic rubberlike polymers generally do not exhibit good building tack and the various means heretofore devised to overcome this deficiency for SBR rubbers, including the addition of natural rubber and synthetic resins or natural products such as rosins or gums during the compounding operation, are not satisfactory for EPDM elastomers. Prior attempts to improve building tack of elastomers generally and EPDM elastomers in particular have concentrated upon the use of one or more adhesive layers to hold the polymer layers together in a sandwichlike structure. There has been a need for a means for improving the building tack of elastomers without any need to resort to stratified structures or the additional step, inherent in making such structures, of coating adhesive on the layers to be adhered. Solvents which usually play a necessary part in the formulation and application of such adhesive layers contribute to air pollution and are desirably eliminated.

THE INVENTION

In accordance with this invention a sulfur-curable synthetic elastomer is provided with excellent building tack by mixing with 10–100 phr. (parts per hundred parts elastomer by weight) of a isoprenoidal resin which is characterized by a polymer of an isoprene/piperylene codimer and an allylically terminated ethylenically unsaturated cyclic compound, the proportion of codimer units in the polymer being about 50–95 percent by weight.

The tackified synthetic elastomers of this invention exhibit a higher level of oil retention and exceptionally good green stock integrity and strength over a wide range of temperatures, compared with similar elastomers tackified by prior art procedures. Compositions of this invention are the only internally tackified EODM elastomers known to produce automobile tires with good properties when built with conventional formulations and tire building techniques. These elastomeric compositions have good repeat tack and long tack life (e.g., 3—4 months) and have been used on commercial tire building equipment to make automobile tires having excellent performance characteristics.

DETAILS OF THE INVENTION

The term "building tack" (referred to herein simply as "tack") is used with its usual meaning as the peculiar characteristic of natural rubber which causes two fresh surfaces to adhere or coalesce. The amount of tack of an elastomer is determined by a so-called "peel test" or "repeat test" described hereinafter.

The isoprenoidal resins useful as tackifiers include polymers of a codimer, such as the Diels-Alder reaction product of isoprene and piperylene polymerized with an allylically terminated ethylenically unsaturated cyclic compound in the presence of aluminum chloride or other Friedel-Crafts catalyst. The allylically terminated cyclic compound can be made by reaction of a cyclopentadiene such as dicyclopentadiene with a terminator such as alpha-methyl styrene or 2-methyl-2-butene. Although the cyclopentadiene compound and terminator can be prereacted before admixing with the codimer, a preferred method of preparing the isoprenoidal tackifier resins of this invention involves simply admixing the codimer, terminator and dicyclopentadiene with aluminum chloride and heating. The cyclopentadiene compound and terminator should be present in about equal amounts by weight or the terminator should be in excess.

Cyclopentadiene itself as well as dicyclopentadiene can be utilized as the cyclic compound and other ethylenically unsaturated cyclic compounds which behave like dicyclopentadiene can also be used, such as 5-methylene-2-norbornene and 5-ethylidene 2-norbornene and the like.

Olefins, particularly monoolefins with internal double bonds such as 2-butene, 2-pentene, 2-hexene, 3-hexene, 2-heptene, 3-heptene and the like can be used as terminators as well as substituted derivatives of alpha-methyl styrene in which the substituents do not interfere with the reaction described. Other similarly reacting materials which provide allylic termination of the unsaturated cyclic compound can also be used.

A convenient source of the raw materials utilized to produce the isoprenoidal resin -methyl-in this invention is the unsaturated hydrocarbon stream from a hydrocarbon cracking process used to make gasoline. Such a stream contains numerous olefins and unsaturated cyclic compounds such as isoprene, piperylene, 2-methyl- 2-butene, cyclopentadiene, dicyclopentadiene and the like. Conveniently such a stream is utilized by simply adjusting the content of ethylenically unsaturated cyclic compound and/or terminator therein by addition of one or the other or both thereto as necessary so that the cyclic compound and terminator are in about equal weight proportions and have a combined weight equal to 5–50 percent of the total weight of the composition, preferably 5–20 percent on that basis. The mixture is then heated at elevated temperature preferably in the range of about 50 to 90° C. in the presence of aluminum chloride to effect codimerization of isoprene and piperylene and polymerization thereof with the allylically terminated ethylenically unsaturated cyclic compounds simultaneously produced in situ. Thus the isoprenoidal resin can be produced in a single-process step by simply heating a mixture containing isoprene, piperylene, ethylenically unsaturated cyclic compound and terminator in the presence of a Friedel-Crafts catalyst.

The isoprenoidal resin tackifier of this invention is incorporated into sulfur curable elastomers in amounts of about 10–100 phr. and preferably in an amount of 30–60 phr. for tire use. For nontire use (e.g., belts and molded shoes) the amount of resin is adjusted for the tack level and properties desired. It is desirable to use as little tackifier as will provide the desired tack for economic reasons and to avoid adverse affects on curability of the polymer.

This invention is applicable to sulfur-curable synthetic elastomers generally and is particularly useful for imparting tack to synthetic elastomers of EODM polymers, that is, polymers of ethylene, a ($C_3$–$C_8$) alpha-olefin and a ($C_6$–$C_{22}$) diene, preferably a nonconjugated diene having only one terminal (polymerizable) double bond. Particularly preferred are polymers of ethylene, propylene and such a nonconjugated diene, these being referred to more specifically as EPDM polymers. Representative EPDM polymers include terpolymers of ethylene/propylene/1,4-hexadiene and related polymers of which the hexadiene is replaced by 1,4-heptadiene, 1,5-heptadiene, 1,4-octadiene, 1,5-octadiene, 1,6-octadiene and the like as well as the lower alkyl ($C_1$–$C_6$) derivatives of these dienes, as for example, 5-methyl-1,4-hexadiene.

Other useful EPDM polymers include polymers of the monomer combinations: ethylene/propylene/dicyclopentadiene, ethylene/propylene/5-ethylidene-2-norbornene and ethylene/propylene/52-norbornene. Sulfur-curable elastomers described in U.S. Pat. No. 3,093,620, U.S. Pat. No. 3,063,973, U.S. Pat. No. 2,933,480 and U.S. Pat. No. 3,211,709 are also useful herein.

Other synthetic rubbers which can be effectively tackified by this invention include butadiene, butadiene/styrene, butyl rubber and combinations of these with natural rubber and/or EODM polymers.

The compositions of the present invention are made by mixing the elastomer and tackifier in any convenient manner which will produce a uniform mixture. This can be accomplished by milling on a conventional rubber mill or in a Banbury mixer. Normally, the tackifier will exhibit significantly affinity for the polymer and this facilitates the mixing which is usually accomplished in a manner of minutes. Conveniently the tackifier can be added to the polymer during the regular compounding operation wherein one or more other additives, fillers, oil, curing agents, antioxidants, pigments, etc. are admixed. The latter are not necessary, however, to gain the advantages of this invention. Curing is affected by conventional methods and under the usual conditions and using customary curing systems.

In the formulations below polymers A, B, C, D and E have the following compositions and characteristics.

POLYMER A

Polymer A is an EPDM polymer made by copolymerizing ethylene with propylene and 1,4-hexadiene in tetrachloroethylene in the presence of a preformed coordination catalyst prepared by mixing $VOCl_3$ and diisobutylaluminum monochloride in accordance with the general procedures of U.S. Pat. No. 2,933,480. EPDM Polymer A has a Mooney (ML-4/250° F.) viscosity of 70 and about 0.6 grammol of ethylenic unsaturation/kg. It contains about 40 weight percent propylene units, 6.5 weight percent 1,4-hexadiene units and about 53.5 weight percent ethylene units.

POLYMERS B, C, D AND E

Polymers B, C, D and E are EPDM polymers made by copolymerizing ethylene with propylene and 1,4-hexadiene in tetrachloroethylene in the presence of a coordination catalyst made in situ by combining $VCl_4$ and diisobutyl aluminum monochloride in accordance with the general procedures of U.S. Pat. No. 2,933,480; hydrogen modification is used in accordance with U.S. Pat. No. 3,051,690. The polymers have Mooney viscosities (ML-4/250° F.) of 40, 18, 40 and 60, respectively and weight proportions (E/P/HD) of 59/36/5, 53.6/42/4.4, 61/36/3 and 61/36/3, respectively.

PEEL TACK

An elastomer test sample is formed into 6×4×0.75-inch sheets and a cotton duck backing imbedded in one face (with "Mylar" polyethylene terephthalate film on the other) in a laboratory compression molding press, using mild pressure at a temperature of 212° F. for 3 minutes. Test strips one-fourth inch wide are cut from the backed sheet, the "Mylar" is removed one day before testing, and pairs are joined by placing the elastomeric surfaces together and rolling with a 8-pound weight. 30 seconds after joining the strips they are pulled apart in a Tensile-testing machine at a draw rate of 2 inches/minute at 25° C. The peel strength is recorded in pounds per linear inch.

REPEAT TACK

A second method of measuring tack is designed to simulate the conditions encountered in automatic tire building equipment. Specimens are cut from either (a) the carcass fabric in 1 inch × ½ inch strips with the cords parallel to the long axis or (b) from fabric constructed as described under the peel test. One test sample is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. The time of contact is determined by a timing mechanism which can be set for an interval of 0.8 to 15 seconds. The air cylinder is removed at 40 p.s.i. providing a break time of about 40 milliseconds. Tack is determined as the instantaneous breaking force measured by a load cell transducer and a high-speed recorder Specific data showing the efficacy of the process of this invention are recorded in the Tables.

EXAMPLE

Preparation of Internally Tackified Carcass Skim Stock

An automobile tire skim stock is compounded by the following steps. A 486-pound batch without curing agents is made by the formulation below by mixing in a water-cooled No. 11 Banbury with ram pressure of 100 p.s.i. and a speed of 40 r.p.m.:

|  | phr. |
|---|---|
| EPDM polymer A | 75 |
| EPDM polymer B | 25 |
| HS-HAF black[1] | 50 |
| FEF black[2] | 40 |
| Zinc oxide | 5 |
| Stearic acid | 1 |
| Isoprenoidal resin[3] | 40 |
| Paraffinic oil | 40 |

[1] High structure, high abrasion furnace black
[2] Fine extrusion furnace black
[3] Betaprene H-100 (Reichhold Chemical Co.)

Betaprene H-100 is the reaction product formed by (1) adjusting the olefin-containing byproduct of a hydrocarbon cracking process so that it contains about 6 percent by weight of each of of 2-methyl-2-butene and dicyclopentadiene with the remainder characterized by substantially equal weight proportions of isoprene and piperylene, and (2) heating the mixture at about 70°–80° C. in the presence of $AlCl_3$ until the reaction is substantially completed. All ingredients except the oil are added in the Banbury, the order listed is used, the Banbury is closed and then run until the temperature reaches 250° F. Paraffinic oil (Sunpar 2280) is added in increments of about 8 pounds over a period of 10 minutes until a total of 67 pounds is reached, the temperature being maintained at about 235° F. Upon discharge from the Banbury, the stock is twice passed through a water cooled two-roll rubber mill for 1 minute, then removed in a sheet one-half inch thick and cooled by passing through a soap stone/water solution.

A 425-pound portion of the batch thus prepared is compounded with curing agents according to the following formulation in the Banbury (operated at 25–30 r.p.m.):

|  | phr. |
|---|---|
| Zinc dimethyldithiocarbamate | 1.5 |
| Tetramethyl thiuram disulfide | 1.5 |
| 2,2'-Dithiobisbenzothiazole | 0.8 |
| Sulfur (Crystex 90) | 3 |

After being discharged from the Banbury 1.25 minutes later, the resulting skim stock is passed twice through a water cooled two-roll rubber mill, removed in a sheet one-half inch thick, cooled by passing through the soap stone/water solution, and stacked.

This skim stock has the following properties:

180° Peel Tack (2 in./min.)

| 30 sec. contact (lbs./linear inch) | 20–36 |
|---|---|
| 3 min. contact (lbs./linear inch) | 20–40 |

Repeat Tack

| 1 sec. contact at 60 lbs./sq.in. | 80–120 |
|---|---|
| 10 sec. contact at 60 lbs./sq.in. | 120–152 |
| Mooney Viscosity (M1-4/212 F.) | 60 |

The curing behavior is as follows:

| Mooney Scorch (at 250° F./280°F.) | 23/12 |
|---|---|

| | |
|---|---|
| Minutes to 5-point rise (at 250° F./280° F.) | 25/8.5 |
| Minutes to 10-point rise (at 250° F./280° F.) | 29/9.5 |

ODR at 330° F.

| | |
|---|---|
| Minimum torque, in./lb. | 4.0–4.5 |
| Minutes to 2-point rise | 2.7 |
| Rate (in. lbs./min.) | 9–12 |
| Minutes to 50% torque | 5.3–5.5 |
| Minutes to 90% torque | 10–12 |
| Maximum torque (in./lb.) | 50 |

Vulcanizate properties (at 25° C. except as noted) after a 25-minute cure at 330° F. are as follows:

Stress-Strain Characteristics

| | |
|---|---|
| Modulus at 300% extension (lbs./sq.in.) | 1300 |
| Tensile strength (lbs./sq.in.) | 2400 |
| Elongation at break (%) | 500 |

Yerzley Resilience

| | |
|---|---|
| at 25° C. (%) | 51.3 |
| at 70° C. (%) | 68 |

Heat Buildup

| | |
|---|---|
| ΔT (°C.) | 75 |
| ΔC (mils) | 32 |
| Final center temperature (°C.) | 145 |
| Brittle temperature, °F. | −56 |
| Clash-berg stiffness, °F. | −47 |
| "H-Pull" Adhesion to treated nylon (1260/1/2) | |
| at 25° C. (lbs.) | 28–30 |
| at 140° C. (lbs.) | 12–14 |

CARCASS FABRIC

210 Filament, 2-piled, 1,260-denier nylon 66 tire cord is used.

APPLICATION OF ADHESIVES TO CARCASS FABRIC

This fabric, moving at the rate of 25 yards/minutes, is dipped once by standard techniques in a composition having the formulation listed below to obtain a 43 mil gauge ply fabric:

| Dip Formulation | Pounds |
|---|---|
| Water | 75 |
| Resorcinol | 13 |
| Formaldehyde (37%) | 14.4 |
| Chlorosulfonated Polyethylene Latex | 200 |
| Emulsifier | 25 |
| Water | 315 |

It is then stretched 10 percent while being dried at 445° F. for 0.8 minute.

PREPARATION OF THE DIPPING COMPOSITION

A. Preparation of Chlorosulfonated Polyethylene Latex

A chlorosulfonated polyethylene is selected containing about 20 percent chlorine and 1 percent sulfur. A 12.5 percent solids solution is prepared by dissolving this chlorosulfonated polyethylene and 0.1 phr. (parts/100 parts of polymer) dinitrotoluene in an 88/12 benzene/isopropanol mixture. Two parts of this solution are then added to one part of water containing 8 phr. of sodium alkyl benzene sulfonate ("Nacconol NRSF") and 0.25 phr. of sodium nitrite in a high shear mixer at 80° C. Solvent is removed from the resulting emulsion with steam at atmospheric pressure to give a latex. After 0.8 part of ammonium alginate has been added for each 100 parts of latex solids, the composition is allowed to cream by standing for several days at room temperature. Typically, a 47.7 percent solids latex results.

B. Preparation of Emulsifier

10 Parts of "Kenflex A-36" and 1 part of oleic acid are mixed, warmed to 100° C. and added to 0.6 part of triethanolamine and 13.4 parts of water. The emulsifier is made by agitating this mixture in a homogenizer. Kenflex A-36 resin is a polymerized aromatic petroleum resin (made by Kenrich Petrochemicals, Inc.) having melting point of 80° C. and a specific gravity of 1.086.

C. Preparation Dipping Composition 13 parts of resorcinol and 14.4 parts of 37 percent formaldehyde are dissolved in 75 parts of water; then 200 parts of the latex prepared in paragraph A above and 25 parts of the emulsifier are added with the stirring. The resulting composition is diluted with 315 parts of distilled water. The pH is about 7.5. The solids content is about 18.8 percent and may generally be in the range of about 20±3 percent. In general this dip is aged at room temperature about 2–3 days. The pH should be about 6.7.

Application of Skim Stock to Coated Nylon

800 Yards of the dry, coated 2-ply (1260/1/2) nylon fabric is calendered on 180° F. rollers with the internally tackified carcass skim stock in a continuous run of 35 minutes without problems or changes in operating conditions. Tire Building The carcass ply fabric was utilized to make automobile tires on NRM model 60-A (National Rubber Machine) automatic tire building apparatus. Ninety tires were built routinely with this commercial equipment and using conventional commercial techniques. Twenty-six of the tires thus made were tested in a step speed wheel test (60 to 110 miles per hour) and were found to be equivalent or better than conventional commercial butadiene/styrene tires of similar construction.

In typical operations an inner liner (formulated as described below) is laid down first, followed by plies of the above-described carcass ply fabric. Beads (prepared as described below) are set and ply ends turned up automatically in about 10–15 seconds at a drum rotation speed of 220 r.p.m. Chaffer strips and treads are attached, the drum is collapsed, and the green tire transferred to a conventional tire mold. The following are useful cure cycle conditions for a "Bag-O-Matic" Press:

| | Temperature (° F.) | Time (Min.) |
|---|---|---|
| Platen (or Mold T) | 320–340 | 1 |
| Curing bag T (165–270 p.s.i.) | 373–390 | 20 |
| Cold water | 60–70 | 1 |
| Blow down and vacuum | | 0.75 |
| Total curing cycle | | 21.75 |

Some typical formulations for making automobile tires are presented below:

Bead Insulation Stock

| | |
|---|---|
| Polymer C | 100 |
| ZnO | 5 |
| Stearic Acid | 1 |
| "Hard" kaolin clay (Suprex) | 40 |
| Isoprenoidal resin[1] | 15 |
| Paraffinic oil (Sunpar 150)[2] | 15 |
| Carbon black (FEF) | 100 |

[1] Betaprene H-100
[2] Viscosity, SUS at 100° F./210°
[3] F. = 509/64.3

The above ingredients are added in the order indicated to a water cooled Banbury mixer and mixed until the temperature reaches 120° C. A rubber mill operated at about 200° F. (93°

C.) can also be used. After the Banbury Stack has been dumped and cooled as described in the skim stock procedure, the following ingredients are admixed with the formulation 160° F. (71° C.) in Banbury or 125° F. (52° C.) on rubber mill.

| | |
|---|---|
| Sulfur (Crystex 90) | 2 |
| Tetramethyl thiuram disulfide | 1 |
| 2,2'-Dithiobisbenzothiazole | 0.5 |
| N-nitrosodiphenylamine | 1.5 |

The use of Crystex 90 in the above formulation prevents blooming and N-nitrosodiphenylamine provides processing safety factor for decreasing the possibility of scorching.

The stock is sheeted, cooled and sheeted as described in the skim stock procedure.

White or Colored Liner Stock

| | |
|---|---|
| Polymer A | 100 |
| ZnO | 5 |
| Stearic Acid | 1 |
| Calcined kaolin clay | 200 |
| Isoprenoidal resin[1] | 40 |
| Polyisobutylene [2] (low mil wt.) | 15 |
| TiO$_2$ | 20 |

[1] Betaprene H-100
[2] Used in place of oil to provide low air permeability

The above ingredients are mixed in a Banbury, discharged at 121° C., sheeted, cooled and then compounded with the following on a rubber roll mill at 52° C. (125° F.):

| | |
|---|---|
| Dimethyl dithiocarbamate | 1.5 |
| Tetramethyl thiuram disulfide | 1.5 |
| 2,2'-Dithiobisbenzothiazole | 0.8 |
| Sulfur (Crystex 90) | 3 |

Alternatively, the cooled stock can be reloaded in a Banbury and compounded over a 1.25-minute period, being dumped at 71° C. (160° F.). Air permeability of this stock after curing is less than $3 \times 10^{18}$ (the volume of gas in cubic centimeters at 0° C. and one atmosphere) passing per second through a 1 centimeter cubic specimen at a pressure difference of one atmosphere measured at room temperature.

BLACK LINER STOCK

Formulation is the same as White Liner Stock except that 70-80 parts carbon black (APF) are substituted for the calcined clay and TiO$_2$. Air permeability of this stock after curing is less than $2 \times 10^{18}$ cc. (STP)/sec./cm$^2$ measured at 25° C.

Friction Stock

| | |
|---|---|
| Polymer B | 75 |
| Polymer D | 25 |
| ZnO | 5 |
| Stearic Acid | 1 |
| Carbon black (FEF) | 40 |
| Carbon black (EPC) | 40 |
| Paraffinic Oil (Sunpar 2280)[1] | 40 |
| Isoprenoidal resin[2] | 40 |

[1] Viscosity, SUS at 100°/210° F. = 2907/165
[2] Betaprene H-100

The ingredients are mixed in a water-cooled Banbury in the order listed, oil being added incrementally beginning at a Banbury temperature of 270° F. the stock is dumped at 310° F. After being sheeted and cooled, it is compounded with the following compounds at 70° C. in Banbury or 50° C. on rubber mill:

| | |
|---|---|
| Sulfur (Crystex 90) | 5 |
| Zinc dimethyl dithiocarbamate | 1.75 |
| Tetramethyl thiuram disulfide | 1.75 |
| Zinc benzothiazyl sulfide | 1 |

UNDERTREAD AND SPLICE CEMENT

An undertread and tread splice cement is prepared using the following formulation:

| | phr. |
|---|---|
| Polymer A | 100 |
| SAF black | 90 |
| Zinc oxide | 5 |
| Paraffinic oil (Sunpar 2280) | 15 |
| Isoprenoidal resin | 75 |

The ingredients are mixed in a Banbury and then discharged at 320° F. The following curing system is then added while milling on a rubber roll mill at 125° F.:

| | phr. |
|---|---|
| Zinc dimethyl dithiocarbamate | 1 |
| Tetramethyl thiuram disulfide | 1 |
| Sulfur (rubber grade) | 2 |
| 2-Mercaptobenzothiazole | 0.8 |

The final formulation is dispersed in hexane to provide a 10 percent solids.

Typically, the bead insulation stock is applied to a bead bundle of 0.37-inch brass-coated steel wire in standard fashion with a 2-inch extruder fitted with a Frazier-type crosshead attachment. The bead bundles are 0.265×0.225 inch in cross section.

The friction stock is frictioned onto one or both sides of a 12-inch-wide sheet of bead fabric to give bead wrap. Strips 1.25 inches wide are cut on a Cameron slitter and fed to a standard National Rubber Machinery bead wrapping machine at room temperature. There they are wrapped around the bead elements made above.

The chafer strips are typically 2.5 inches wide and 0.030 inch thick. They are made by calendering the carcass skim composition (given above) onto square-woven nylon fabric (840-denier, 19×18 count) which has been treated with resorcinol/formaldehyde resin.

TREAD STOCK

A tread stock is prepared using the following formulation:

| | phr. |
|---|---|
| Polymer E | 100 |
| ISAF black | 100 |
| Paraffinic oil (Sunpar 150) | 75 |
| Zinc oxide | 5 |
| Stearic acid | 1 |
| Sulfur (rubber type) | 1.5 |
| Tetramethyl thiuram disulfide | 1.5 |
| 2-Mercaptobenzothiazole | 0.8 |

Typically, a mixture of polymer, black oil, ZnO and stearic acid is prepared in a Banbury, dumped, cooled, reloaded and compounded with curing agents at 180° F. over a 1.25-minute period. The last compounding can be done on a rubber roll mill.

The tacky cement described above is used to bond this tread stock to the carcass.

The tackified polymer compositions of this invention are illustrated above in typical formulations with conventional compounding agents used in rubber art. The tack of polymer compositions of this invention is even greater when additives such as oil, black and other fillers and additives are absent.

I claim:
1. A tackified sulfur-curable synthetic elastomer composition consisting essentially of a synthetic hydrocarbon elastomer in admixture with about 10–100 phr. of an isoprenoidal resin which consists essentially of a polymer of an isoprene/piperylene codimer and an allylically terminated ethylenically unsaturated cyclic hydrocarbon compound, the polymer containing about 50–95 percent codimer units by weight.

2. The composition of claim 1 to which the elastomer is a terpolymer of ethylene, a $C_3$—$C_8$ alpha-olefin and a $C_6$–$C_{22}$ diene.

3. The composition of claim 2 in which the elastomer is an ethylene/propylene/$C_{eh}$–$C_{22}$ diene polymer.

4. The composition of claim 3 in which the elastomer is an ethylene/propylene/1,4-hexadiene polymer.

5. The composition of claim 3 in which the allylically terminated cyclic compound is the reaction product of dicyclopentadiene and alpha-methyl styrene.

6. The composition of claim 3 in which the allylically terminated cyclic compound is the reaction product of dicyclopentadiene and 2-methyl butene-2.

7. The composition of claims 5 and 6 in which the isoprenoidal resin contains 80–95 percent codimer units by weight.

8. The composition of claim 1 in which the isoprenoidal resin is made by polymerization of isoprene and piperylene in the presence of the cyclic compound, a terminator and a Friedel-Crafts catalyst.

9. The composition of claim 3 in which the isoprenoidal resin is made by copolymerizing, in the presence of a Friedel-Crafts catalyst, isoprene and piperylene in the presence of dicyclopentadiene and (1) alpha-methyl styrene or (2) 2-methyl-2-butene.

10. The composition of claim 9 in which the elastomer is an ethylene/propylene/1,4-hexadiene polymer.

11. A black loaded composition of claim 10 containing 30–60 phr. of isoprenoidal resin.

12. The composition of claim 1 in which the elastomer is butyl rubber, a butadiene polymer, or a butadiene/styrene polymer along or in combination with natural rubber.

13. The composition of claim 1 in which the synthetic elastomer is a butyl rubber, a butadiene polymer, or a butadiene/styrene polymer in combination with an ethylene/$C_3$–$C_8$ alpha-olefin/$C_6$–$C_{22}$ diene terpolymer.

14. The composition of claim 3 in which the isoprenoidal resin is made by copolymerizing, in the presence of a Friedel-Crafts catalyst, isoprene and piperylene in the presence of cyclopentadiene and (1) alpha-methyl styrene or (2) 2-methyl-2-butene.

PO-1050
(5/69)

UNITED STATES PATENT OFFICE
CERTIFICATE OF CORRECTION

Patent No. 3,607,829          Dated September 21, 1971

Inventor(s) Alexander T. Harris

It is certified that error appears in the above-identified patent and that said Letters Patent are hereby corrected as shown below:

Column 7, line 1, "stack" should be --stock--.

Column 7, line 42, "$3 \times 10^{18}$" should be --$3 \times 10^{-8}$--.

Column 7, line 53, "$2 \times 10^{18}$" should be --$2 \times 10^{-8}$--.

Claim 2, line 1, "to" should be --in--.

Claim 7, line 1, "5 or 6" should be --5 and 6--.

Signed and sealed this 4th day of April 1972.

(SEAL)
Attest:

EDWARD M. FLETCHER, JR.　　　　　　ROBERT GOTTSCHALK
Attesting Officer　　　　　　　　　　Commissioner of Patents